Nov. 4, 1952     L. L. KILL     2,616,579
GRAIN HARVESTING MACHINE
Filed March 23, 1951     2 SHEETS—SHEET 1
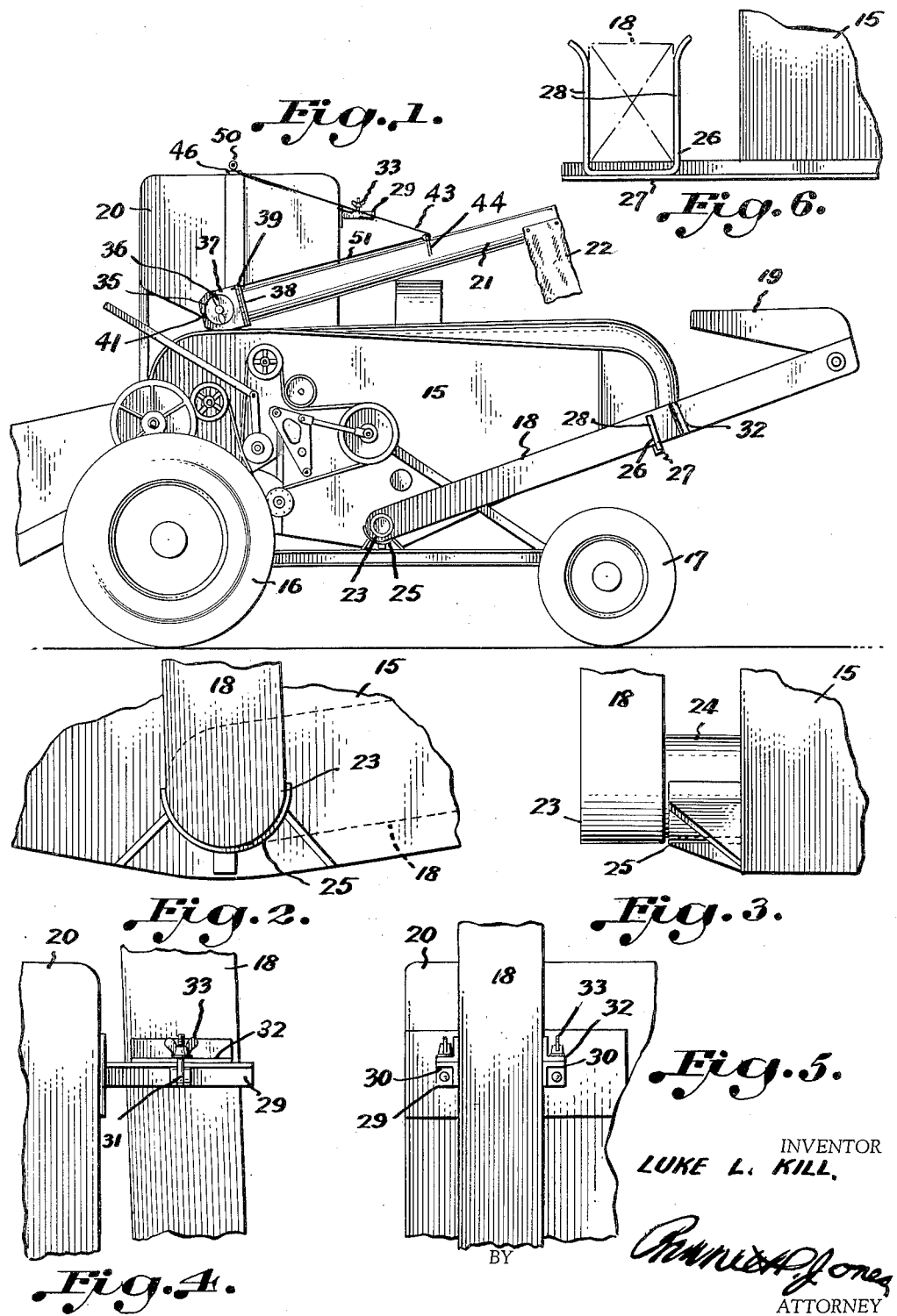
INVENTOR
LUKE L. KILL
ATTORNEY

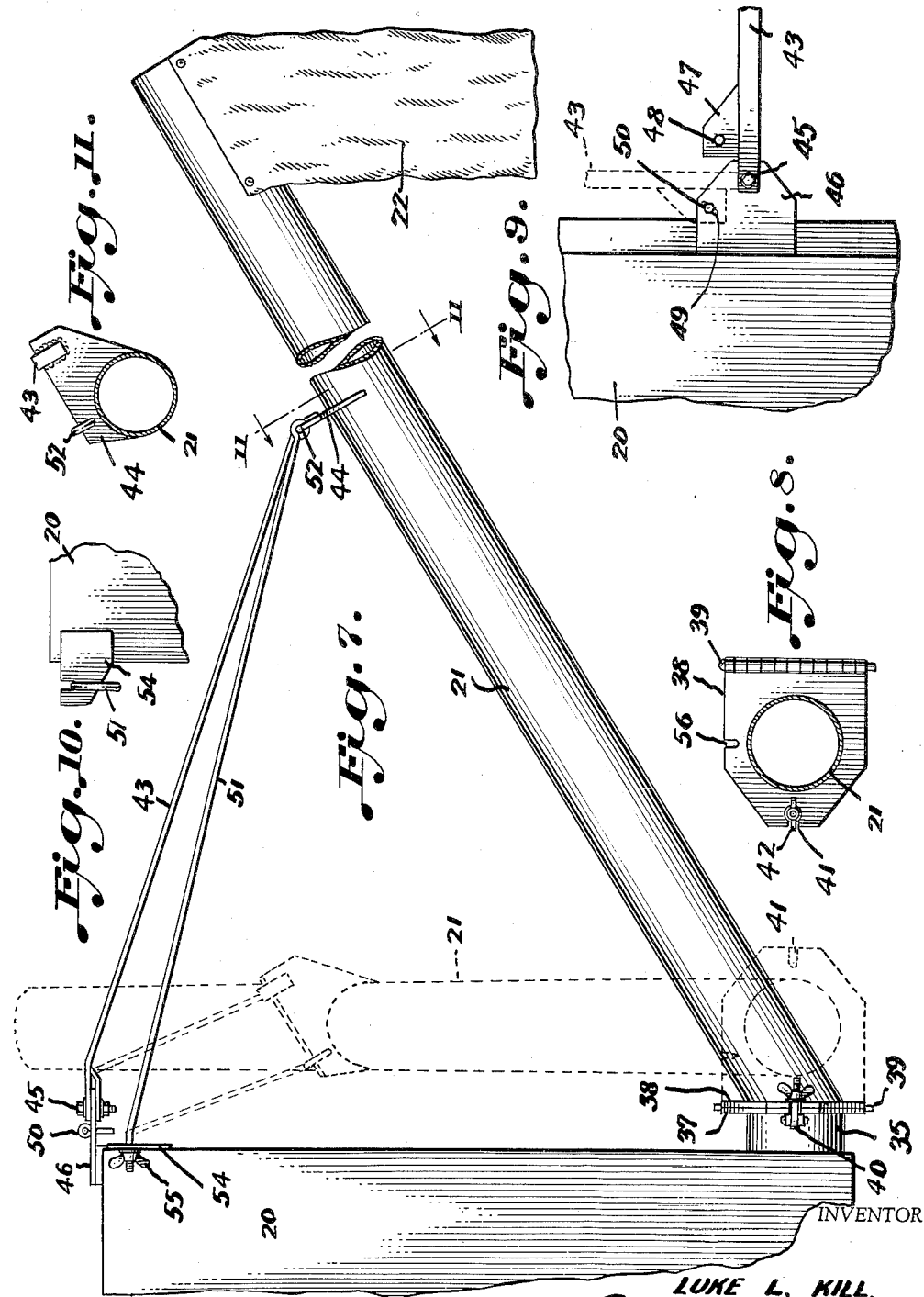

Patented Nov. 4, 1952

2,616,579

UNITED STATES PATENT OFFICE 2,616,579

GRAIN HARVESTING MACHINE

Luke L. Kill, Delphos, Ohio, assignor to Kill Brothers Company, Delphos, Ohio, a corporation of Ohio Application March 23, 1951, Serial No. 217,248

4 Claims. (Cl. 214—83.26)

1

This invention is a grain harvesting machine and pertains particularly to mobile mechanism for harvesting the standing grain, cleaning the same and finally delivering or discharging the cleaned grain from the machine to an adjoining depository or vehicle.

The machine to which the present inventive idea pertains is of that type wherein the harvested grain is moved by means of a substantially vertical fixed elevator to an elevated grain bin or hopper, from the lower end of which the grain is discharged by means of a fixed substantially horizontal laterally projecting conveyor to a receiving vehicle usually travelling beside the harvesting machine. Due to the fixed relationship of the vertically disposed elevator and the laterally projecting discharge member, difficulty is encountered in properly moving the vehicle to and from its field of operation, and machines so constructed are difficult to house for the same reasons. It is the primary object of the present invention to so arrange the normally vertically disposed elevator, as well as the normally disposed discharge member, that they may be swung to such position with respect to the machine with which they are associated as to offer no upstanding or lateral projections of such elements to interfere with the travel of the machine or to prevent the machine from being housed within a structure of sufficient size to accommodate the machine itself.

A further object of the invention is to so mount the elevator and the discharge member that they may be quickly and easily swung to either operative or inoperative positions and to provide means for firmly maintaining these elements in either of such positions.

A further and particular object of the invention is to so mount the elevator and discharge element as not to interfere or in any way hinder the proper and efficient operation of the machine, which involves mountings for these elements of such character and construction as to enable the mountings to be effectively and economically employed, which mountings are so constructed and arranged as to be positive in action, easy of operation and which will prove thoroughly effective in obtaining the sought objectives.

With the foregoing objects in view, together with others which will appear as the description proceeds, the invention consists in the novel construction, combination and arrangement of parts, all as will be described more fully hereinafter, illustrated in the drawing, and particularly pointed out in the claims.

2

In the drawings:

Fig. 1 is a side elevation of a conventional form of grain harvesting machine and illustrating the elevator and side discharge swung to inoperative or travelling or storage positions, Fig. 2 is a fragmentary side elevation, on an enlarged scale, showing the manner in which the lower end of the elevator is attached to the vehicle, Fig. 3 is a front elevation in fragmentary form of the structure shown in Fig. 2, Fig. 4 is a fragmentary side elevation showing the manner in which the elevator is maintained in vertical or operative position, Fig. 5 is a front elevation of the structure shown in Fig. 4, Fig. 6 is a top plan view of the supporting bracket which maintains the elevator in storage position, Fig. 7 is a fragmentary rear elevation of the discharge or delivery mechanism, the dotted lines indicating the position this mechanism will assume when in storage position, Fig. 8 is a sectional view taken through the delivery tube and showing the hinge connection between the latter and the body of the vehicle, Fig. 9 is a top plan view of a portion of the grain bin and showing the connection of the supporting brace to the bin, Fig. 10 is a detail elevation showing the means for latching the delivery tube in storage position, and Fig. 11 is a transverse sectional view taken through the discharge tube and showing the manner in which the supporting brace is attached thereto.

Referring now more particularly to the drawing, 15 represents generally the body of the tractor or harvesting machine, supported for movement over the ground by the front wheels 16 and the rear wheels 17. The machine is of that type wherein the standing grain is harvested by being separated and cleaned as it passes into the machine and is forced into the elevator tube 18 through which it is forced and discharged at the free end of the tube when the latter is in vertical or operative position through the discharge nozzle 19 and into the hopper 20 carried by the machine. From the hopper or bin 20 the grain is forced, usually by an auger, through the discharge tube 21 disposed in substantially horizontal position when in operation and extending laterally from the machine, from whence the grain passes from the free end of the tube past the guard 22 and into the receiving vehicle which normally travels beside and at a uniform speed with the harvesting machine.

The elevator in that type of harvester here illustrated comprises a hollow elongated tube of substantially rectangular cross section as shown by the dot-dash lines in Fig. 6. In order to accomplish the objects of the invention, this tube, instead of being in fixed upright or vertical position as usual, is hinged as at 23 at its lower end to the lower end of the harvester. This hinge connection includes a sleeve 24 (Fig. 3) which projects laterally from the lower end of the tube and which is rotably supported in the arcuate stirrup 25 affixed to the side of the machine. This construction establishes free communication between the lower end of the elevator shaft and the interior of the machine, and permits the shaft or tube to swing either downwardly into approximately a horizontal position parallel with the longitudinal axis of the machine, and yet permits the shaft to be swung vertically into operative position with its discharge spout 19 above and in communication with the open end of the grain bin or hopper 20. The vehicle frame has attached thereto a bracket 26, affixed to an arm 27 secured to and projecting laterally from the vehicle body. The arms 28 of the bracket are spaced apart a distance sufficient to accommodate between them the elevator tube or shaft 18 as shown more particularly in Figs. 1 and 6 of the drawings.

In order that the elevator shaft or tube may be secured in upright or operative position, a retaining bracket is attached at an appropriate place upon the vehicle to receive and accommodate the said shaft. This bracket is indicated at 29, the arms 30 of which are secured at their rear ends to the rear face of the grain bin or hopper 20 in parallelism and sufficiently far apart to receive between them the shaft or tube 18 as shown particularly in Figs. 4 and 5 of the drawing. In order to maintain the shaft in vertical or operative position in a positive manner, each of the bracket arms 30 has pivoted thereto one end of a bolt 31, the said bolts being adapted to swing to vertical position and to clampingly engage with angle members 32 secured to the sides of the shaft or tube 18. The free ends of the bolts are provided with ring nuts 33 to enable this clamping action to be carried out.

It is apparent from this construction that when the shaft 18 is in operative or vertical position it will be held rigidly and against accidental displacement so that the grain forced therethrough will pass from the delivery nozzle into the open upper end of the bin or hopper 20. When it is desired to move the vehicle from its field of operations to a storage building, the wing nuts 33 will be moved to releasing position, whereupon the shaft will be swung rearwardly and downwardly upon its pivotal connection 23 until it rests within the supporting bracket.

The specific construction and mounting of the grain discharge tube is shown particularly in Figs. 1 and 8 to 11 inclusively. The grain bin or hopper 20 is provided with the conventional circular outlet 35 at its lower end, in which outlet is usually a feed screw or worm shown at 36 in Fig. 1. The tubular outlet 35 has its end provided with a plate 37 to which is hinged a similar plate 38, the hinge being indicated at 39. The tube 21 is rigidly attached to the plate 38, and the hinge is so mounted that the tube and its affixed plate 38 may swing inwardly of the vehicle or into a position parallel to the longitudinal axis thereof. One end of the plate 37 has hingedly connected thereto one end of a bolt 40 to engage in a notch 41 of the plate 38 when the latter is swung into such position as to be in flat contact with plate 37. A wing nut 42 on the free end of the bolt is tightened so as to firmly secure the plates together when the tube 21 is in operative or laterally projecting position.

A brace for the tube 21 is indicated at 43. This brace may be an elongated flat bar welded at its outer end to a plate 44 rigidly secured to the tube 21 near the outer end thereof, and the inner end of the said brace is pivotally connected as at 45 to an arm 46 rigidly secured to the bin 20 near the top thereof. The brace 43 is provided near its inner end with a laterally projecting plate 47 provided with an opening 48 adapted to register with a slot or opening 49 in fixed plate 46 when the brace 43 is swung in a direction inwardly of the vehicle. A locking pin 50 passed through these registering openings maintains the brace 43 secure in its inwardly swung position. It will be apparent that the pivotal connection 45 must be disposed in vertical alignment with the hinge 38 of the tube to permit of the lateral swinging movements of the tube 21.

A reenforcing brace 51 is hingedly connected as at 52 to the plate 44 of the tube 21. This brace extends inwardly from the tube and engages at its inner end in the notch 53 in a plate 54 rigidly secured to the upper end of the bin 20. A wing nut 55 threaded upon the extreme inner end of the supplementary brace 51 maintains the said brace in rigid position when the tube is in operative position, but permits of the said supplemental brace being released from plate 54 when the tube is swung inwardly to inoperative position. When in this latter position the supplemental brace 51 may drop down and be seated in the notch 56.

From the construction thus described, it is apparent that when the tube 21 is in operative position it extends laterally from the vehicle so that the grain passing therethrough from the bin 20 will be delivered to an accompanying vehicle. The parts described rigidly maintain the tube in this position. When it is desired to retract the tube 21, it is but necessary to release the wing nuts 42 and 55 and to disengage the bolt 40 from the coacting plates 37—38 and to lift the supplemental brace 51 from engagement in the notch 53. After the tube 21 has been swung to a position in parallelism with the longitudinal axis of the vehicle, as indicated in dotted lines in Fig. 7, the locking pin 50 is engaged in the registering apertures 48—49 as shown by dotted lines in Fig. 9 to lock the tube in this inoperative position. The supplemental brace 51 is dropped down so as to seat in the notch 56 and thus be supported in its non-operative position.

From the foregoing it will be seen that the grain elevator and discharge tube of the combine perform their usual functions when the machine is in operation and yet they may be moved to an out of the way position very quickly and easily with a minimum of effort when it is desired to move the vehicle either to and from its field of operations, or into housing quarters.

I claim:

1. A harvesting machine comprising a vehicle having a grain hopper; the combination of an elevator for delivering grain to said hopper, a pivotal connection between said elevator and said vehicle to permit the said elevator to be moved to substantially horizontal position, and a discharge duct hingedly connected to said hopper and capable of being swung into a position in substantial parallelism with the direction of travel of the vehicle.

2. A harvesting machine comprising a vehicle having a grain hopper provided with a delivery outlet at its lower end, a plate surrounding said outlet, a delivery tube, a plate at the lower end of said delivery tube hingedly connected on a vertical axis to said outlet plate, means for locking said plates in flat engagement with one another, a brace hingedly connected at its inner end to said hopper above said outlet and with its hinged connection in vertical alignment with the hinge of said plates, said brace connected at its outer end to said tube, and means for locking said brace to said hopper when the tube has been swung to a predetermined position.

3. A harvesting machine comprising a vehicle having a grain hopper equipped with an outlet at its lower end, a flat plate surrounding said outlet, a delivery tube, a flat plate rigid with the lower end of said tube and hingedly connected with the plate of said outlet on a vertical axis, means for locking said plates in flat engagement with one another, a brace rigidly connected at one end to said tube near the outer end thereof, a pivot member connecting the inner end of said brace to said hopper in vertical alignment with the hinge of said plates, a lock plate on said brace, and a pin to connect said lock brace to said hopper when said tube is moved to a predetermined position.

4. A harvesting machine comprising a vehicle having a grain hopper provided with a circular opening at its lower end, a flat plate rigidly connected to and surrounding said outlet, a tube corresponding in diameter with the said outlet, a flat plate secured to and surrounding the inner end of said tube, a hinge connecting said tube plate with said outlet plate on a vertical axis, means for locking said plates in flat engagement with one another, a brace rigidly connected at its outer end with said tube near the outer end thereof and pivoted at its inner end to said bin above said plates, means for locking said brace against movement when the tube has been moved to a predetermined position, an auxiliary brace hingedly connected at its outer end to said tube near the outer end thereof, and means at the inner end of said auxiliary brace to lock the same to the said hopper.

LUKE L. KILL.

REFERENCES CITED

The following references are of record in the file of this patent:

UNITED STATES PATENTS

| Number | Name | Date |
|---|---|---|
| 797,356 | Hetherington | Aug. 15, 1905 |
| 824,840 | Bradford | July 3, 1906 |
| 1,344,396 | Holt | June 22, 1920 |
| 1,477,212 | Eckertz | Dec. 11, 1923 |
| 2,022,166 | Welty | Nov. 26, 1935 |
| 2,139,417 | Milan | Dec. 6, 1938 |
| 2,438,301 | Schulte | Mar. 23, 1948 |